United States Patent
Schaeffr et al.

(10) Patent No.: US 12,473,940 B2
(45) Date of Patent: Nov. 18, 2025

(54) ASSEMBLY FOR SECURING A FERRULE TO A GEAR-BOX USING A SPRING-LOADED LOCK PIN

(71) Applicant: SUPRAJIT ENGINEERING LIMITED, Bangalore (IN)

(72) Inventors: Scott Schaeffr, Wichita, KS (US); Pancham Koorana Anand, Bangalore (IN)

(73) Assignee: SUPRAJIT ENGINEERING LIMITED (IN)

( * ) Notice: Subject to any disclaimer, the term of this patent is extended or adjusted under 35 U.S.C. 154(b) by 475 days.

(21) Appl. No.: 17/600,813

(22) PCT Filed: Apr. 3, 2020

(86) PCT No.: PCT/IB2020/053191
§ 371 (c)(1),
(2) Date: Oct. 1, 2021

(87) PCT Pub. No.: WO2020/202090
PCT Pub. Date: Oct. 8, 2020

(65) Prior Publication Data
US 2022/0196059 A1 Jun. 23, 2022

(30) Foreign Application Priority Data
Apr. 4, 2019 (IN) .............................. 201941013583

(51) Int. Cl.
*F16H 57/025* (2012.01)
*F16B 19/02* (2006.01)
(Continued)

(52) U.S. Cl.
CPC .............. *F16B 21/12* (2013.01); *F16B 19/02* (2013.01); *F16B 21/16* (2013.01); *F16H 57/025* (2013.01); *Y10T 403/7033* (2015.01)

(58) Field of Classification Search
CPC ...... F16B 21/12; F16B 21/16; F16B 2200/69; F16H 57/025; Y10T 403/7033
See application file for complete search history.

(56) References Cited

U.S. PATENT DOCUMENTS

| | | | | |
|---|---|---|---|---|
| 856,436 | A | * | 6/1907 | Walden .................. B25B 1/125 269/182 |
| 2,448,278 | A | * | 8/1948 | Ronning ................. F16D 3/387 279/97 |

(Continued)

FOREIGN PATENT DOCUMENTS

| | | | | |
|---|---|---|---|---|
| EP | 0940606 A2 | | 9/1999 | |
| GB | 625981 | * | 7/1949 | .............. F16B 21/16 |

OTHER PUBLICATIONS

International Search Report and Written Opinion of the ISA/US in PCT/IB2020/053191, dated Sep. 3, 2020, 1 10pgs.

*Primary Examiner* — Michael P Ferguson

(57) ABSTRACT

The present invention provides an assembly (100) for securing a gear-box (101) using a spring-loaded lock pin (105) wherein the gear-box (101) is locked with a ferrule (103) by means of a spring-loaded lock pin (105) which enables lock and unlock of the ferrule (103) through a 'press and release' mechanism. The spring-loaded lock pin (105) comprises an internal keyway (106) for facilitating anti-rotational movement of spring-loaded lock pin (105) and slot recess (107) for enabling hassle-free lock and unlock between the ferrule (103) and the gear-box (101). Further, external keyway (102) provided in the gear-box (101) mates with the internal keyway (106) etched in the spring-loaded lock pin (105) for facilitating anti-rotational movement of spring-loaded lock pin (105) under locked and unlocked condition of the ferrule (103).

1 Claim, 4 Drawing Sheets

(51) Int. Cl.
*F16B 21/12* (2006.01)
*F16B 21/16* (2006.01)

(56) References Cited

U.S. PATENT DOCUMENTS

| | | | | |
|---|---|---|---|---|
| 2,926,034 | A * | 2/1960 | Weaver | F16D 1/116 |
| | | | | 403/328 |
| 3,992,119 | A * | 11/1976 | Recker | F16D 3/387 |
| | | | | 403/322.2 |
| 5,911,215 | A * | 6/1999 | Fisher, Jr. | F41B 5/1438 |
| | | | | 124/86 |
| 6,729,250 | B2 | 5/2004 | Friestad et al. | |
| 9,163,378 | B2 * | 10/2015 | Doan | E02F 3/58 |
| 10,076,074 | B2 * | 9/2018 | Case | F16H 57/039 |
| 10,982,720 | B2 * | 4/2021 | Hautecoeur | F16D 3/387 |

* cited by examiner

ASSEMBLY FOR SECURING A FERRULE TO A GEAR-BOX USING A SPRING-LOADED LOCK PIN

CROSS-REFERENCE TO RELATED APPLICATIONS

This application is a National Stage filing under 35 U.S.C. § 371 of International Application No. PCT/IB2020/053191 filed Apr. 3, 2020, which claims the benefit of Indian Patent Application number 201941013583 filed Apr. 4, 2019, which applications are incorporated herein by reference.

TECHNICAL FIELD OF THE INVENTION

The present invention generally relates to an assembly for securing a gear-box using a spring-loaded lock pin. Further, the present invention particularly relates to a gear-box that is removably secured with a ferrule employing a 'press and release' mechanism.

BACKGROUND OF THE INVENTION

Gear-box lock mechanisms have evolved drastically over the past few years. Currently, turn-locks are employed for securing the gear-box with a ferrule which acts as a mating part between the gear-box and the turn-lock. The lock mechanism adapted by the current system requires the turn-lock to be manually rotated till the ferrule is firmly secured with the gear-box.

Due to continuous movement, there exists a possibility for the turn-lock to rotate in an anticlockwise direction till the ferrule is disengaged with the gear-box thereby causing the gear-box to unlock prematurely. Further, the current system adapts a primitive approach by demanding a manual confirmation for checking if the ferrule is firmly secured with the gear-box.

The U.S. Pat. No. 6,729,250B2 titled "Coupling for a flexible rotatable drive shaft" discloses a flexible rotatable drive shaft with a first male coupling that is received in a second female coupling located on a gearbox. The male coupling has two circumferential grooves that define a first fully engaged position and a second intermediate engaged position. In both engaged positions the male coupler is mounted to the gearbox, however only in the fully engaged position is the flexible rotatable drive shaft in a driving relationship with the gearbox. The female coupler is provided with a latch pin for selectively engaging the first and second circumferential grooves. The latch pin is provided with a circumferential surface for engaging the grooves and latching the flexible rotatable drive shaft to the gearbox and a recessed section for unlatching the flexible rotatable drive shaft from the gearbox.

The U.S. Pat. No. 6,715,433B1 titled "Restraint for a flexible drive shaft gearbox" discloses a flexible rotatable drive shaft to drive a seed meter of a seeding machine. The seeding machine is provided with a seed meter gearbox. The seed meter gearbox has a flexible rotatable drive shaft receiving portion and a gear receiving portion. The gearbox output is drivingly coupled to the seed meter for driving the seed meter. The flexible rotatable drive shaft receiving portion extends outwardly from the gear receiving portion for receiving the drive ferrule of the flexible rotatable drive shaft. The gearbox restrain extends outwardly from the seeding machine and engages the flexible rotatable drive shaft receiving portion. The gearbox restrain comprises two legs that are parallel to the gearbox drive axis. The flexible rotatable drive shaft receiving portion is sandwiched between the two legs to prevent rotation of the gearbox.

Hence, there is a need for a simple and hassle-free mechanism for firmly lock or unlock a gear box by employing minimum number of components.

SUMMARY OF THE INVENTION

The present invention overcomes the drawbacks of the prior art by providing an assembly for securing a gear-box using a spring-loaded lock pin. The assembly comprises a gear-box for enabling variable vehicle speed and torque, wherein the gear-box comprises an external keyway for facilitating anti-rotational movement under locked and unlocked condition of the gear-box. A ferrule is inserted into the gear box, wherein the ferrule comprises a circular recess for securing the position of ferrule within the gear-box. The gear-box and the ferrule are removably secured using a spring-loaded lock pin. The spring-loaded lock pin enables lock and unlock of the ferrule by means of a 'press and release' mechanism.

The spring-loaded lock pin comprises an internal keyway, a slot recess and a projection. The internal keyway is etched in the spring-loaded lock pin for facilitating anti-rotational movement of the spring-loaded lock pin under locked and unlocked condition of the gear-box. The spring-loaded lock pin is removably slided into the gear-box such that the external keyway in the gear-box mates with the internal keyway etched in the spring-loaded lock pin for facilitating anti-rotational movement of the spring-loaded lock pin under locked and unlocked condition of the ferrule and the gear-box. The slot recess is etched on one side of the spring-loaded lock pin for enabling hassle-free lock and unlock between the ferrule and the gear-box. Upon being pressed, the spring-loaded lock pin releases the ferrule from the gear-box into the slot recess to enable free movement of the ferrule under unlocked condition.

Further, the assembly comprises a bellow and an o-ring disposed on opposite sides of the spring-loaded lock pin. The bellow protects the spring-loaded lock pin from external dust on the side in which it is disposed, and the o-ring disposed on the side opposite to the bellow, protects the spring-loaded lock pin from external dust on the side in which it is disposed. Further, the assembly comprises a washer to enable proportional load distribution of the spring-loaded lock pin. The washer prevents the occurrence of damages to the o-ring caused due to the constant force exerted by the spring-loaded lock pin. The washer and a circlip are employed for maintaining the position of the spring-loaded lock pin under locked condition of the gear-box and ferrule.

The present invention provides an assembly for securing a gear-box using a spring-loaded lock pin. The internal keyway etched in the spring-loaded lock pin facilitates anti-rotational movement of the spring-loaded lock pin under locked and unlocked condition of the gear-box. Further, the 'press and release' mechanism adapted by the present invention ensures a simple and secure engagement between the ferrule and the gear box.

BRIEF DESCRIPTION OF THE DRAWINGS

The foregoing and other features of embodiments will become more apparent from the following detailed description of embodiments when read in conjunction with the accompanying drawings. In the drawings, like reference numerals refer to like elements.

DETAILED DESCRIPTION OF THE INVENTION

Reference will now be made in detail to the description of the present subject matter, one or more examples of which are shown in figures. Each example is provided to explain the subject matter and not a limitation. Various changes and modifications obvious to one skilled in the art to which the invention pertains are deemed to be within the spirit, scope and contemplation of the invention.

The present invention provides an assembly for securing a gear-box using a spring-loaded lock pin wherein the gear-box is secured with a ferrule by means of a spring-loaded lock pin which enables lock and unlock of the ferrule through a 'press and release' mechanism. The spring-loaded lock pin comprises an internal keyway for facilitating anti-rotational movement of the spring-loaded lock pin and a slot recess for enabling hassle-free lock and unlock between the ferrule and the gear-box. Further, an external keyway provided in the gear-box mates with the internal keyway etched in the spring-loaded lock pin for facilitating anti-rotational movement of the spring-loaded lock pin under locked and unlocked condition of the ferrule.

Figure 1:
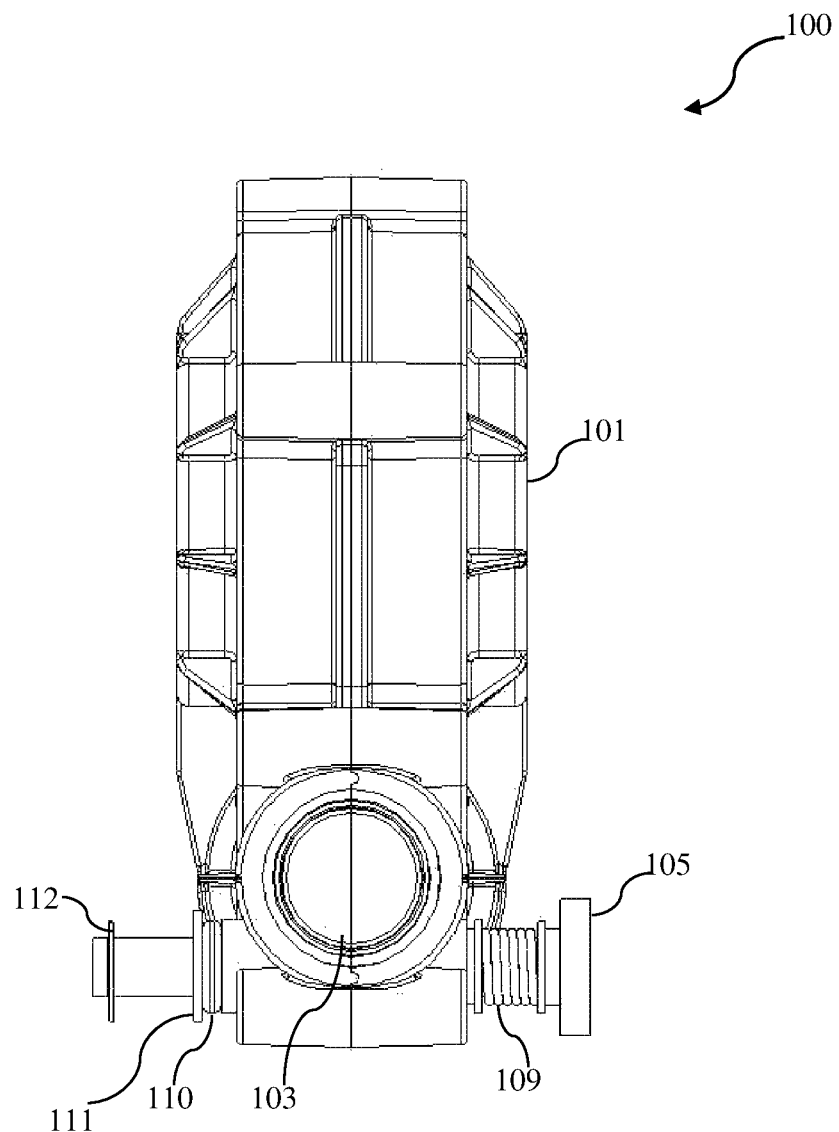
FIG. 1 illustrates a front view of a gear-box with spring-loaded lock pin under disengaged condition of the gear box.

FIG. 1 illustrates an assembly for securing a gear-box using a spring-loaded lock pin. The assembly (100) comprises a gear-box (101) for enabling variable vehicle speed and torque, wherein the gear-box (101) comprises an external keyway (102) for facilitating anti-rotational movement under locked and unlocked condition of the gear-box (101). A ferrule (103) is inserted into the gear box (101), wherein the ferrule (103) comprises a circular recess (104) for securing the position of ferrule (103) within the gear-box (101). The gear-box (101) and the ferrule (103) are removably secured using a spring-loaded lock pin (105). The spring-loaded lock pin (105) enables lock and unlock of the ferrule (103) by means of a 'press and release' mechanism.

The spring-loaded lock pin (105) comprises an internal keyway (106), a slot recess (107) and a projection (108). The internal keyway (106) is etched in the spring-loaded lock pin (105) for facilitating anti-rotational movement of the spring-loaded lock pin (105) under locked and unlocked condition of the gear-box (101). The spring-loaded lock pin (105) is removably slided into the gear-box (101) such that the external keyway (102) of the gear-box (101) mates with the internal keyway (106) etched in the spring-loaded lock pin (105) for facilitating anti-rotational movement of the spring-loaded lock pin (105) under locked and unlocked condition of the ferrule (103) and the gear-box (101). The slot recess (107) is etched on one side of the spring-loaded lock pin (105) for enabling hassle-free lock and unlock between the ferrule (103) and the gear-box (101). Upon being pressed, the spring-loaded lock pin (105) releases the ferrule (103) from the gear-box (101) into the slot (107) to enable free movement of the ferrule (103) under unlocked condition.

Further, the assembly (100) comprises a bellow (109) and an o-ring (110) which are disposed on opposite sides of the spring-loaded lock pin (105). The bellow (109) protects the spring-loaded lock pin (105) from external dust on the side in which it is disposed and the o-ring (110) disposed on the side opposite to the bellow (109), protects the spring-loaded lock pin (105) from external dust on the side in which it is disposed. Further, the assembly (100) comprises a washer (111) to enable proportional load distribution of the spring-loaded lock pin (105). The washer (111) prevents the occurrence of damages to the o-ring (110) caused due to the constant force exerted by the spring-loaded lock pin (105). The washer (111) and a circlip (112) are employed for maintaining the position of the spring-loaded lock pin (105) under locked condition of the gear-box (101) and ferrule (103).

Figure 2:
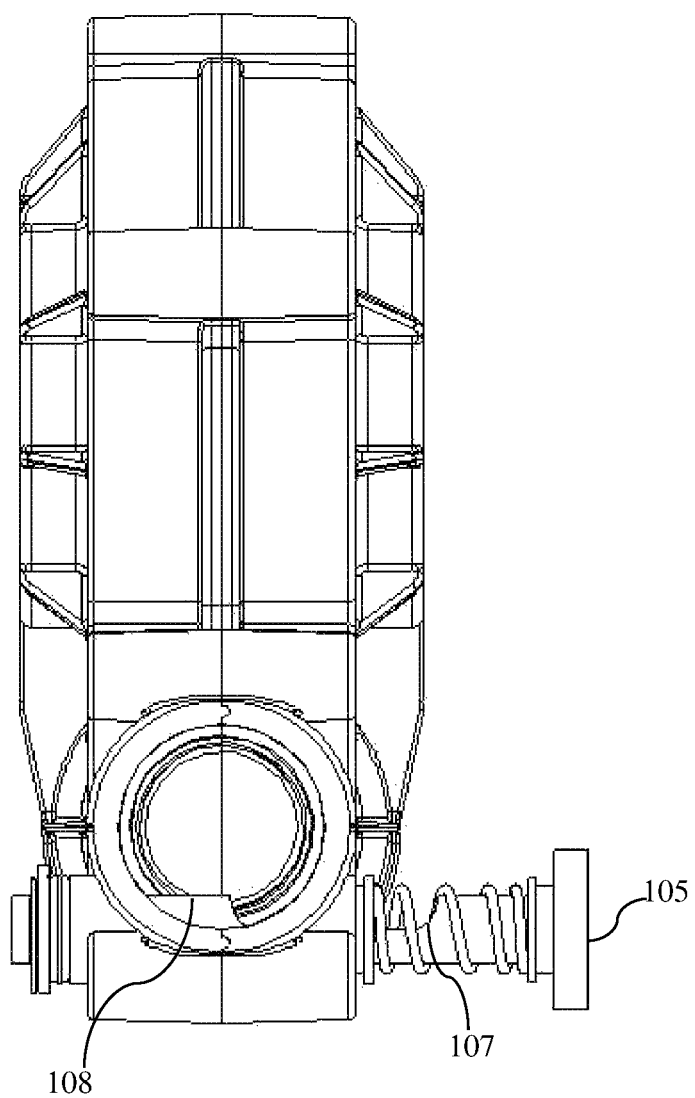
FIG. 2 illustrates a front view of a gear-box with spring-loaded lock pin under engaged condition of the gear box.

FIG. 2 illustrates a gear-box with spring-loaded lock pin under locked condition of the gear box. The slot recess (107) provided on the spring-loaded lock pin (105) enables hassle-free lock and unlock between the ferrule (103) and the gear-box (101). The projection (108) of the spring-loaded lock pin (105) indicates locked condition between the ferrule (103) and gear-box (101).

Figure 3:
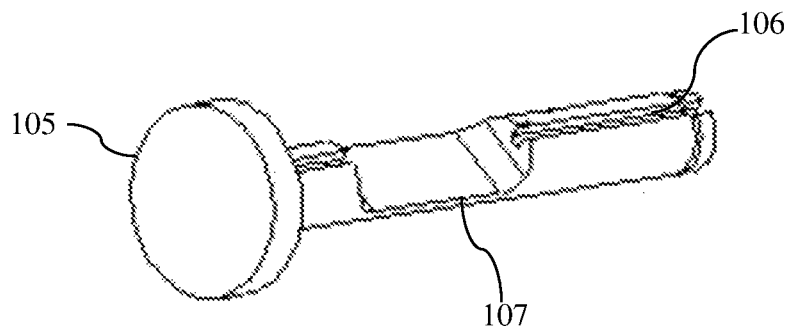
FIG. 3 illustrates an exploded view of the spring-loaded lock pin with an internal groove and slot to facilitate anti-rotational movement of the spring-loaded lock pin.

FIG. 3 illustrates an exploded view of the spring-loaded lock pin with an internal keyway and slot recess to facilitate anti-rotational movement of the spring-loaded lock pin. The internal keyway (106) facilitates anti-rotational movement of the spring-loaded lock pin (105) under locked and unlocked condition of the gear-box (101). The slot recess (107) provided on the spring-loaded lock pin (105) enables hassle-free lock and unlock between the ferrule (103) and the gear-box (101).

Figure 4:
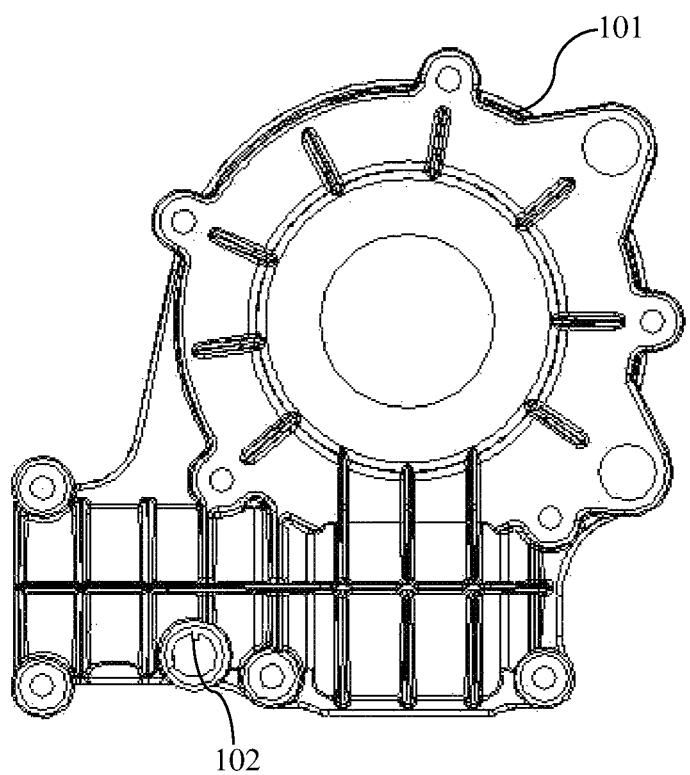
FIG. 4 illustrates a side-view of the gear box with an external projection to facilitate anti-rotational movement of the spring-loaded lock pin.

FIG. 4 illustrates a side-view of the gear box with an external keyway to facilitate anti-rotational movement of the spring-loaded lock pin. The gear-box (101) comprises an external keyway (102) for facilitating anti-rotational movement under locked and unlocked condition of the gear-box (101). The external keyway (102) of the gear-box (101) mates with the internal keyway (106) etched in the spring-loaded lock pin (105) for facilitating anti-rotational movement of the spring-loaded lock pin (105) under locked and unlocked condition of the ferrule (103) and the gear-box (101).

Figure 5:
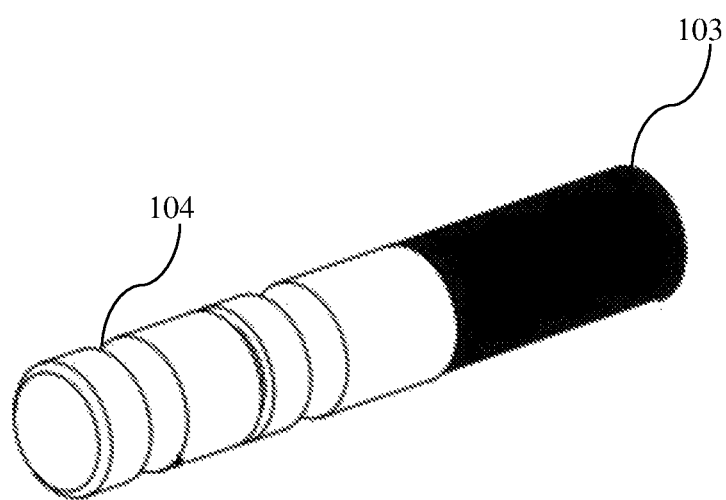
FIG. 5 illustrates a perspective view of the ferrule with a circular groove for securing the position of the ferrule within the gear-box.

FIG. 5 illustrates a perspective view of the ferrule with a circular recess for securing the position of the ferrule within the gear-box. The circular recess (104) secures the position of ferrule (103) within the gear-box (101). Further, the assembly (100) enables a simple 'press and release' mechanism, wherein upon being pressed, the spring-loaded lock pin (105) releases the ferrule (103) from the gear-box (101) into the slot recess (107) to enable free movement of the ferrule (103) under unlocked condition. Therefore, the present invention provides a hassle-free mechanism for locking or unlocking a gear box by employing a minimum number of components.

The present invention provides an assembly for securing a gear-box (101) using a spring-loaded lock pin (105). The internal keyway (106) etched in the spring-loaded lock pin (105) facilitates anti-rotational movement of the spring-loaded lock pin (105) under locked and unlocked condition of the gear-box (101). Further, the 'press and release' mechanism adapted by the present invention ensures a simple and secure engagement between the ferrule (103) and gear box (101).

While at least one exemplary embodiment has been presented in the foregoing detailed description, it should be appreciated that a vast number of variations exist.

REFERENCE NUMBERS

| Components | Reference Numbers |
| --- | --- |
| Assembly | 100 |
| Gear-box | 101 |
| External keyway | 102 |
| Ferrule | 103 |
| Circular recess | 104 |
| Spring-loaded lock pin | 105 |
| Internal keyway | 106 |
| Slot recess | 107 |
| Projection | 108 |
| Bellow | 109 |
| O-ring | 110 |
| Washer | 111 |
| Circlip | 112 |

We claim:

1. An assembly for securing a drive shaft within a gear-box using a spring-loaded lock pin, the assembly comprising:
   a gear-box for enabling variable vehicle speed and torque, the gear-box comprising a housing having a drive shaft aperture extending through a sidewall thereof and a pair of aligned lock pin apertures extending through a pair of opposing housing walls transverse to the drive shaft aperture, the lock pin apertures each having an inwardly projecting key;
   a drive shaft comprising a ferrule inserted into the gear box through the drive shaft aperture, the ferrule having an annular recess defined within a cylindrical sidewall thereof;
   a spring-loaded lock pin comprising a head and a lock pin body extending through the lock pin apertures for interfacing with the annular recess of the ferrule and securing the ferrule within the gear box, the lock pin comprising:
   a longitudinally-extending keyway recessed into a cylindrical sidewall of the lock pin, such that the key of each lock pin aperture mates with the keyway for preventing rotation of the lock pin and enabling sliding movement of the lock pin between a locked position and an unlocked position;
   a slot recess corresponding to the cross-sectional shape of the ferrule recessed into the cylindrical sidewall of lock pin on one side thereof;
   a bellows disposed on one longitudinal end of the lock pin between the head of the lock pin and the gear-box, the bellows biasing the lock pin to the locked position and protecting the interior of the gear-box from external dust;
   a circlip disposed on the longitudinal end of the lock pin opposite to the bellows for retaining the lock pin within the lock pin apertures of the gear-box;
   an o-ring disposed on the lock pin between the circlip and the gear-box, the o-ring protecting the interior of the gear-box from external dust; and
   a washer disposed on the lock pin between the circlip and the o-ring, wherein the washer prevents damage to the o-ring;
   wherein, in the locked position of the lock pin, a portion of the lock pin is disposed within the annular recess of the ferrule to secure the ferrule within the gear box, and wherein the portion of the lock pin within the annular recess is viewable within the drive shaft aperture for indicating the locked condition; and
   wherein, in the unlocked position of the lock pin, the head of the lock pin is pressed toward the gear-box against the bias of the bellows such that the slot recess is aligned with the ferrule and the portion of the lock pin is slid out of the annular recess to enable release of the ferrule from the gear-box aperture.

\* \* \* \* \*